(No Model.)  5 Sheets—Sheet 1.

F. H. RICHARDS.
WEIGHING MACHINE.

No. 579,446.  Patented Mar. 23, 1897.

Fig. 1.

Witnesses:
Chas. D. King.
Fred. J. Dole.

Inventor:
F. H. Richards (No Model.)

F. H. RICHARDS.
WEIGHING MACHINE.

No. 579,446.

Patented Mar. 23, 1897.

Fig. 6.

Witnesses:
Chas. D. King.
Fred. J. Dole.

Inventor:
F. H. Richards.

(No Model.)  F. H. RICHARDS.  5 Sheets—Sheet 5.
WEIGHING MACHINE.

No. 579,446.  Patented Mar. 23, 1897.

Witnesses:
Chas. D. King.
Fred. J. Dole.

Inventor:
F. H. Richards.

UNITED STATES PATENT OFFICE.

FRANCIS H. RICHARDS, OF HARTFORD, CONNECTICUT.

WEIGHING-MACHINE.

SPECIFICATION forming part of Letters Patent No. 579,446, dated March 23, 1897.

Application filed November 2, 1896. Serial No. 610,824. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines for automatically weighing predetermined quantities of material, granular or otherwise; and it has for its object the provision of improved mechanism of this type by means of which sluggish materials may be positively delivered to the load-receiver and positively discharged therefrom without clogging the stream-controlling and load-discharging devices.

My present invention is in the nature of an improvement upon those shown in my applications, Serial No. 609,199, filed October 17, 1896, and Serial No. 606,379, filed September 19, 1896.

One of the important features of my present improvements is a stream-controller comprising a suitable feeder-carrier supporting an endless feeder and having a movement independent of the traveling movement of its feeder for the purpose of coöperating with suitable stream-supplying means to cut off the stream therefrom. In the preferred construction this feeder-carrier oscillates about an axis passing through the supply of material flowing from a suitable source or chute and closes the mouth of said chute by a swinging movement divided into two periods, in the former of which it reduces the supply of material from a stream of relatively large volume to a small drip-stream, while in the latter it entirely cuts off this drip-stream. This operation of the feeder-carrier for varying the area of the opening through which the material is supplied to the weighing mechanism may be entirely independent of the operation of the endless feeder for positively advancing the material supported on the upper run thereof, it being obvious that this endless feeder may be caused to travel either during the whole of the time when the supply-opening is delivering its stream or during any desired portion or portions of this period.

Another important object of the invention is to provide as a part of the weighing mechanism a pair of load-dischargers, both of which are operative on the weighing of each load, one of these load-dischargers being usually in the form of a closer for controlling the outlet through which the weighed load is delivered, while the other will be in the form of a load-discharging conveyer, preferably endless, supported on a carrier fixed to the bucket in such a position as to close the main portion of the mouth of the latter and support the load which has been made up by the weighing mechanism.

As it is very important in a properly-constructed machine of this type that all of the operations should take place in a predetermined order, I deem it necessary to control the movements of the feeder-carrier and the load-dischargers by means of interlocking devices which will positively prevent interference with the proper sequence of operations of these main elements and their coöperative mechanisms.

In the drawings accompanying and forming part of this specification.

Similar characters designate like parts in all the figures of the drawings.

The framework illustrated in the present case for supporting the several operative parts of my improved weighing-machine comprises a chambered supporting-base 3, having a pair of side frames 2 and 4 rising therefrom and connected at their upper ends by means of a cross-beam or top plate 5, which may carry the usual hopper H for supplying material to the load-receiver of the weighing mechanism.

Referring first to Figs. 1 to 8, inclusive, the load-receiver is in the present case a bucket G, pivotally supported by suitable knife-edge bearings on scale-beams B and B', which in turn are mounted in a similar manner on the base 3 of the framework. As before stated, the stream-controller, which regulates the supply of material to the bucket G, comprises a feeder-carrier and a feeder, the former of which is designated in a general way by V and may be advantageously mounted for oscillation at one end thereof on a shaft 72, journaled in bearings in the side frame 2 and the left-hand hanger 5', depending from the top plate 5, and at the other end thereof supported for oscillation in the side frame 4 and in the right-hand hanger 5', depending from said top plate. The body portion of this carrier comprises in the present case two end pieces 7 and 7', rigidly connected with each other, the former having a sleeve 8 integral therewith and supported by the bearing in the left-hand hanger 5' and forming a long journal for the shaft 72, while the other end piece 7' has an integral shaft 8' extending therefrom in alinement with the sleeve 8 and with the shaft 72 and is supported, as before stated, by the side frame 4 and the right-hand hanger 5'.

The feeder or endless conveyer is designated in a general way by F and is carried around a series of rollers journaled for rotation in the end pieces 7 and 7' of the carrier. One of these rollers, which is designated by 9, constitutes a driver for actuating a scraper or rotary brush 10, also supported by the end pieces 7 and 7', while the other rollers are indicated herein by 9' and serve to properly position and support the endless feeder when the latter is driven by its actuating means. All of these rollers have their inner faces in an arc struck from the axis of oscillation of the carrier.

In the present case I prefer to employ for imparting traveling movements to the feeder F a rotary driving means in the form of a driver 12, having its axis of movement coincident with that of the feeder-carrier. This driver 12 may be fixedly secured to the inner end of the shaft 72 in position to frictionally engage the left-hand edge of the upper run of the feeder F and actuate the same when the shaft 72 is rotated. For the purpose of properly guiding the right-hand edge of said run I prefer to support loosely upon the inwardly-extending end (not shown) of the shaft 8' a guide 12', corresponding to the driver 12.

The feeder-carrier may be balanced by suitable weights 90 in the usual manner, and will have actuators for closing and opening the mouth of the supply-chute H. The actuator for operating the controller to cut off the stream may be a counterweighted lever 500, mounted on the side frame 4 and operating upon the face of a cam 501, secured to the shaft 8', (see Figs. 1 and 6,) while the actuator for opening the chute to supply material to the bucket is in the nature of a counterweighted lever 550, pivotally supported on the inner end of the scale-beam B and operative for transmitting its movements to a thrust-rod 518, pivotally connected with the sleeve 8, (see Figs. 1, 3, and 5,) this thrust-rod also having a connection to the frame 2 by means of a suitable link 520.

Figure 1:
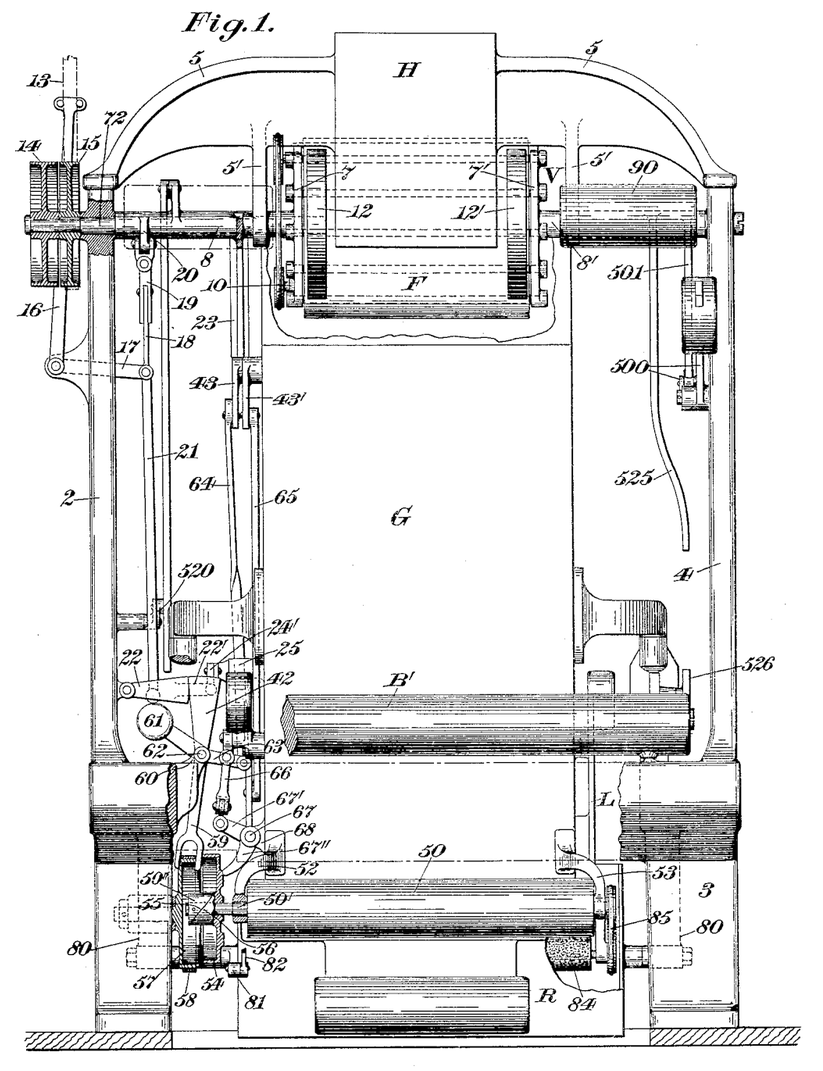
Figure 1 is a sectional front elevation of an automatic weighing-machine embodying my present improvements.
Figures 2, 3:
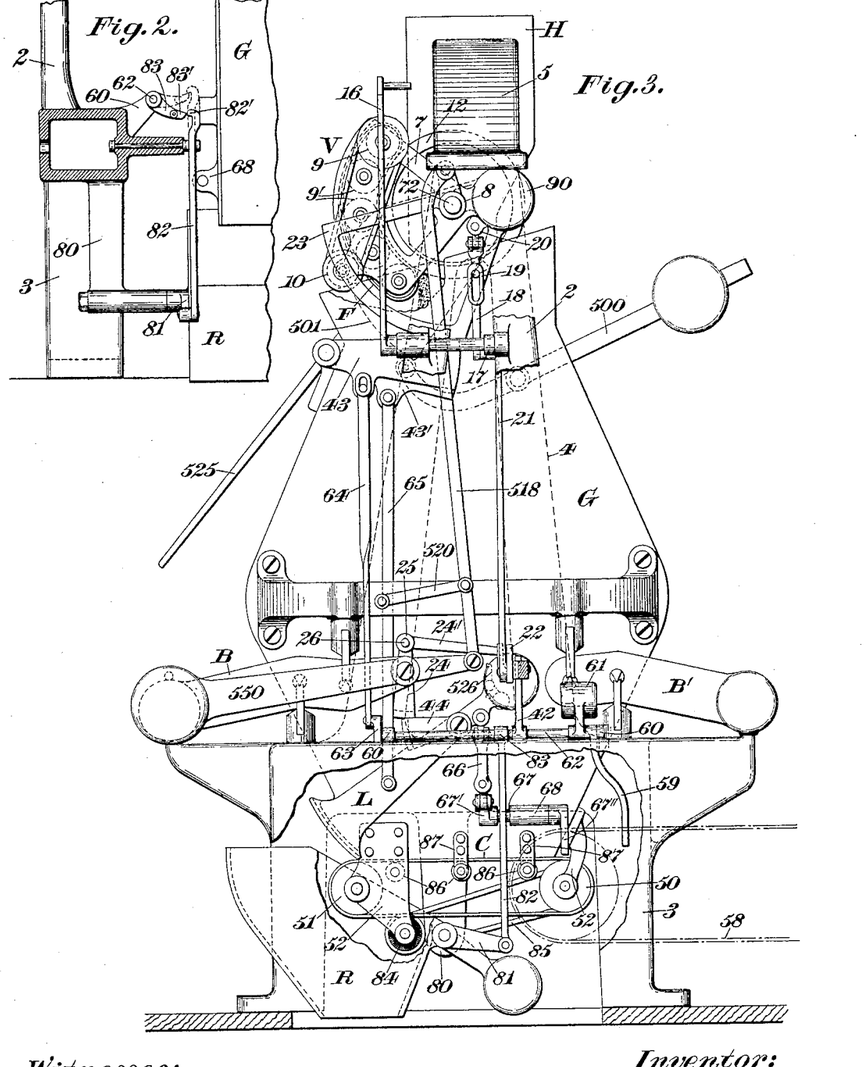
Fig. 2 is a detail sectional front elevation of a portion of the devices at the lower left-hand side, as seen in Fig. 1, this view illustrating means for actuating a belt-shipper, hereinafter more particularly referred to, for throwing off the belt from the driving-pulley of the load-discharging conveyer by the action of a suitable regulator-hopper.
Fig. 3 is a side elevation, with parts removed, of the machine shown in Fig. 1, the view being taken looking from the left-hand side in said figure and showing the stream-controller in position to deliver a full stream to the weighing mechanism.
Figure 6:
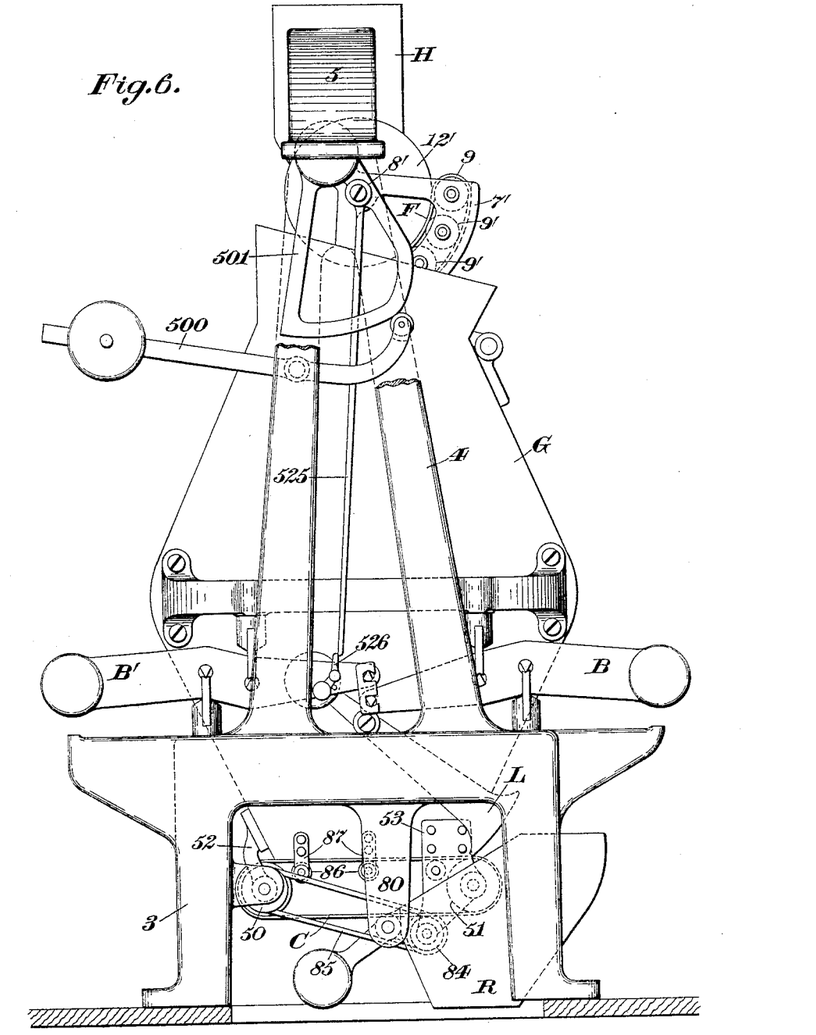
Fig. 6 is a side elevation of the machine looking from the right in Fig. 1, and illustrates the positions of the parts just prior to the final cut off of the stream.

For the purpose of holding the feeder-carrier against oscillation during the reducing period, to thereby permit a drip-stream to be supplied to the bucket, a drip-lever, such as 525, Figs. 1 and 6, may be employed, this lever being of the usual construction and positioned so as to be engaged by a by-pass stop 526 during the reducing period and released by said stop at the moment of the cut-off of the stream.

It will be apparent that in order to properly feed the material from the hopper H into the bucket the feeder F, and hence the feeder-driver 12, should be operative while the mouth of the chute is open and during the closing movement of the stream-controller, and especially during the stream-reducing movement of the latter.

As before stated, the driver 12 is carried by the shaft 72, and this shaft will be intermittently operated in the present instance by a driving-belt 13, shiftable from a loose pulley 14 to a fast pulley 15, both of which pulleys may be supported on said driving-shaft.

For the purpose of throwing the belt 13 from one of these pulleys to the other I have provided belt-shipping means operative by the feeder-carrier. The belt-shipper may be in the form of an angle-lever pivotally supported on the side frame 2 of the machine, the long arm 16 of said angle-lever constituting the shipper proper, while the short arm 17 is connected to a link 18, the upper end of which coöperates with and fits in a bifurcation of a slotted link 19, pivoted to an arm 20, projecting from the sleeve 8. The slot in the link 19 is in the present instance of such length that the belt-shipper 16 will not be actuated to throw off the belt 13 until the cut-off movement of the stream-controller takes place, and, on the other hand, it will not be effective to throw on the belt after the discharge of a load until the stream-controller is oscillated to its open position. (Shown in Fig. 3.) The lever-arm 17 may also have pivotally connected thereto a rod 21, the lower end of which is pivoted to a locking-stop 22, forming one of a series of load-discharging-movement limiters, which in connection with corresponding load-supplying-movement limiters constitute an interlocking mechanism by means of which all of the movements of the principal elements may be positively controlled.

All of the load-supplying-movement limiters are operative with the load-discharger or load-dischargers of the weighing mechanism, and the load-discharging-movement limiters are operative with the stream-controlling mechanism. The load-supplying-movement limiters are effective alternately with the load-discharging-movement limiters, and these sets are preferably reciprocally effective. Moreover, where a plurality of load-dischargers is employed the movements of these parts, when all are operative on the weighing of each load, as is the case in the present instance, will preferably be positively dependent the one upon the other, and each of these will have a separate load-supplying-movement limiter coöperative with the interlocking mechanism of the stream-controlling device. In like manner the movements of the separately-operative portions of the stream-controller will be positively regulated, the feeder-carrier and the feeder having in this case separate load-discharging-movement limiters, each operative for preventing the discharge of the load until the supply of material to the bucket is entirely cut off.

In connection with the endless feeding-conveyer and with the endless load-discharging conveyer a conveyer-movement limiter is employed, which is so operative with one of said feeders that it will limit the movement of the other, and preferably alternately-effective conveyer-movement limiters are employed, one of which is operative with one conveyer and the other with the other conveyer. In the preferred construction these limiters or stops are operative with couplers or belt-shippers for coupling the respective conveyers to suitable driving means, and these stops operate to block said coupling movements—that is to say, in this case they block the shifting of the driving-belts from their respective loose pulleys to the corresponding fast pulleys.

As hereinbefore stated, the stop 22 is one of the load-discharging-movement limiters. The others are herein shown at 23 and 24. The coöperative load-supplying-movement limiters or stops are designated, respectively, by 42, 43, 43', and 44. The load-discharging-movement limiter 22 is pivoted to the side frame 2 of the machine, and the corresponding limiter 24 is pivoted on the side of the bucket, these two limiters being connected, preferably, by means of a universal connection between the extension 22' of the stop 22 and a rock-arm 24', secured to a sleeve 25, which carries the stop 24 and is supported for oscillation on a stud 26, projecting from the side of the bucket. The two stops 22 and 24 coöperate, respectively, with the stops 42 and 44, the last two mentioned being operative, respectively, with a pair of load-dischargers, one of which is in the form of a swinging closer controlling the outlet-opening from the bucket through which the material is delivered, while the other load-discharger may be an endless conveyer supported by carrying members fixed on the bucket, this conveyer being constructed to close the bottom of the bucket and to have a traveling movement for delivering the load through the outlet-opening at the delivery end thereof when the closer is shifted to uncover said opening.

The shiftable or swinging load-discharger or closer (designated herein in a general way by L) is pivoted to the sides of the bucket, its axis of movement being in the central vertical plane of the load-receiver G, and in the present case when the load is made up the outer end of said closer will swing upward and thereby uncover the opening at the delivery end of the conveyer.

Figure 7:
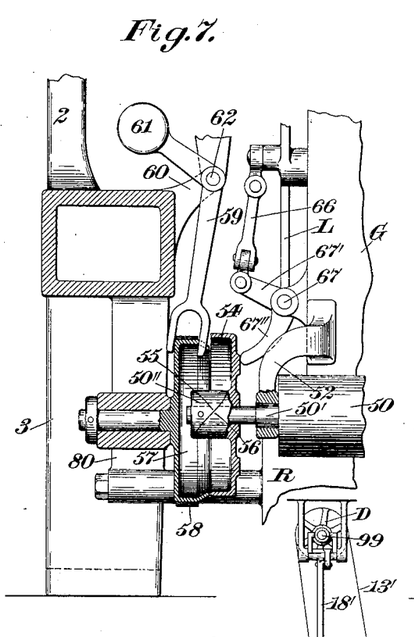
Figs. 7 and 8 are enlarged sectional detail front elevations of the mechanism shown at the lower left-hand side in Fig. 1, and illustrate the positions of the driving-belt for the load-discharging conveyer and of coupling mechanism therefor, hereinafter more particularly referred to, when said parts are in their respective idle and working positions.

The load-discharging conveyer is designated in a general way by C, and is mounted on rotary carriers or rollers 50 and 51, journaled for rotation in brackets or hangers 52 and 53, depending from the sides of the bucket. The roller 50 constitutes the driver for the conveyer and has its shaft extended through the left-hand hanger 53, as seen in Figs. 1 and 7, and is enlarged to form a stop 50', while at the extreme outer end of this shaft there is another stop 50''. Between these stops a pulley 54 is mounted on the shaft, and this pulley constitutes the driver or fast pulley for operating the roller 50, and thereby driving the endless conveyer C. As this pulley is shown, however, it is loosely mounted on said shaft and has a limited amount of free rotary movement besides being slidable on the shaft for the purpose of coupling it or making it fast to the shaft. The means employed in the present instance for this purpose is a friction-coupling which embodies a cam operative for sliding this pulley along the rotary carrier or shaft and coupling it thereto when the driving-belt for the endless conveyer C is shifted onto said pulley. This friction-coupling is preferably formed by a pair of curved cam-faces oblique to the axis of the rotary carrier or shaft, one of these cam-faces, 55, being formed on the stop 50'', while the other, 56, is formed on the end of the hub of the pulley 54, (see Figs.

Figure 8:
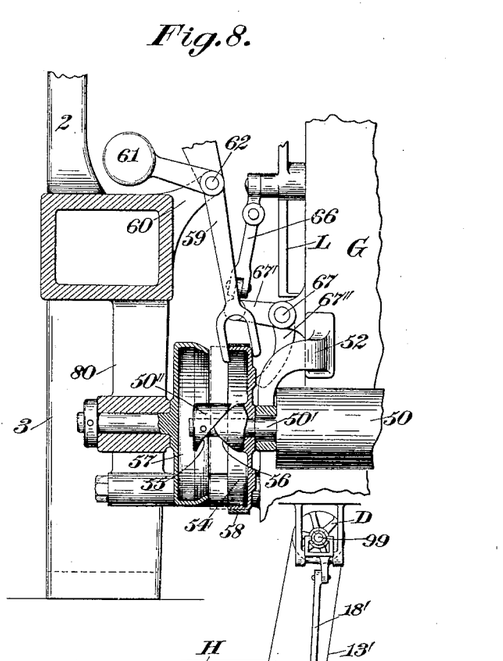

1, 7, and 8,) the construction and organization of the stops 50' and 50" and the pulley being such that when the pulley is moved from the position shown in Fig. 7 to that illustrated in Fig. 8 the cam-faces 55 and 56 will cause the wedging of the hub of said pulley between the stops 50' and 50" before the pulley has made a half-revolution and preferably at about the time it has completed a quarter-revolution, and thus couple the pulley to the carrier 50.

A loose pulley coöperative with the pulley 54 is represented at 57 and is supported for rotation on the side of the base 3 of the machine, as clearly shown in Figs. 7 and 8. This loose pulley normally supports thereon a driving-belt 58, by means of which the conveyer C is driven, and for the purpose of shifting said belt from one of these pulleys to the other I may employ a belt-shipper 59, the operation of which is reciprocal to that of the belt-shipper 16.

The belt-shipper 59 is secured in the present case to a rock-shaft 62, journaled in brackets 60, extending inward from the upper left-hand side of the base 3, the movement of the belt-shipper for throwing on the belt being controlled by a counterweight 61, integral with said belt-shipper, while its movement for throwing off the belt will preferably be effected by connections from a regulator or hopper R, which will be more particularly referred to hereinafter.

The stop 42, which coöperates with that shown at 22, is also fixed on the shaft 62, and hence moves in unison with the belt-shipper 59, these stops and the belt-shippers for the driving-belts 13 and 58 being so organized that the stops are reciprocally effective, and each serves, in turn, to block the operation of the other. The shaft 62 also controls the operation of the load-supplying-movement limiter or stop 43, said shaft having a rock-arm 63, secured thereto at the rear end thereof, which rock-arm actuates a connecting-rod 64, connected with the stop 43, the connection between said rod and stop being preferably such as to permit a slight vertical movement of these parts relatively to each other.

The load-supplying-movement limiter or stop 44 is in fixed relation with the closer L and has its axis of movement coincident therewith, this stop being so disposed as to coöperate with the load-discharging-movement limiter 24. The stop-faces of these two oscillatory members are in the present instance laterally-projecting flanges, the outer face of that on the stop 24 coacting with the upper end of that on the stop 44 to block the movement of the latter when the parts are in the positions shown in Fig. 3, while the inner face of the flange on the stop 44 engages the rear end of the flange on the stop 24 to block the return movement of the latter when the parts are in the positions shown in Fig. 5.

The closer L is intended to be shifted from its closed to its open position on the coupling of the pulley 54 to its rotary carrier and preferably by connections from said pulley. In the construction illustrated herein the closer has connected thereto a link 66, pivoted to a rock-arm 67', fixed on the rear end of a rock-shaft 67, journaled in a bearing 68 on the side of the bucket and having secured to its forward end a second rock-arm 67", the free end of which is in position to engage the pulley 54 and force the same on the return of the closer to its shut position to slide on the rotary carrier from the position shown in Fig. 8 to that illustrated in Fig. 7.

It should be understood that on the uncoupling of the pulley 54 on its return to its idle position (shown in Figs. 1 and 7) the closer L is shut by its own weight, the body portion of the valve in the rear of its axis being effective in opposition to the force of its balance-weights.

I prefer to employ a regulator for the purpose of controlling the uncoupling of the load-discharging conveyer from its driving means and for permitting the shutting of the closer L, this regulator being in the present case in the form of a hopper journaled in hangers 80, forming part of the base 3, said hopper being counterweighted in advance of its axis and having a rock-arm 81 secured to one of its trunnions (see Figs. 2 and 3) and pivotally connected to a rod 82 for actuating the belt-shipper 59 to shift the belt 58 from the pulley 54 on the loose pulley 57. The upper end of this rod is hooked at 82' for the purpose of engaging a stop 83' (shown in Fig. 2) on the outer end of a rock-arm 83, secured to the rock-shaft 62. This stop is in the form of a by-pass which will be engaged by the hook 82' when the hopper is in the position shown in Fig. 5, and on the return of said hopper to the position shown in Fig. 3 will be actuated from the position illustrated in dotted lines to that indicated in full lines in Fig. 2.

In connection with the conveyer C, I prefer to employ a scraper or rotary brush 84, similar to that illustrated at 10, the brush 84 being supported in the present instance, however, for rotation in bearings in the hangers 52 and driven by means of a belt 85, operated from the rotary carrier 50, it being obvious that this brush will serve to remove any material which may adhere to the face of the belt C.

In order that the upper run of the load-discharging conveyer may be maintained in position for closing the bottom of the bucket G, I prefer to provide supporting-rollers 86, on which this upper run may rest, these rollers being carried by suitable brackets 87, depending from the sides of the bucket.

Figures 9, 10:
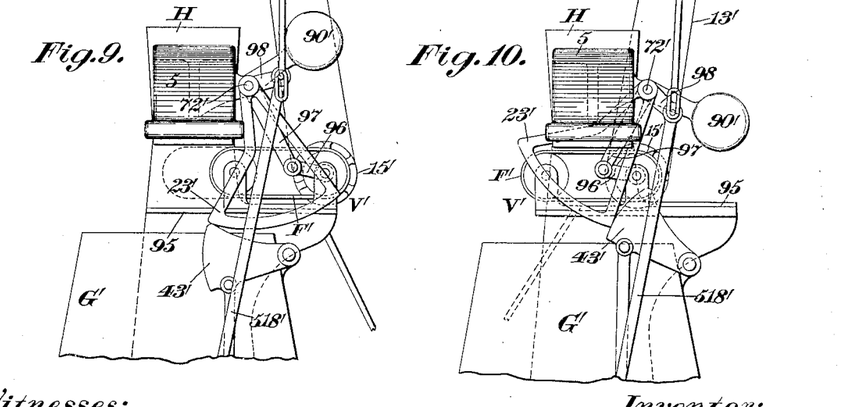
Figs. 9 and 10 are detail side elevations illustrating different positions of a modified form of stream-controller, which will be described in detail hereinafter.

In Figs. 9 and 10 I have illustrated a modification of my invention in which the steam-controller is not oscillatory about an axis passing through the stream of material, but reciprocates beneath the mouth of the supply-chute H. In this case the feeder-carrier V' is in the form of a traveler supported for reciprocation on a bed 95 and is operated by a link connection controlled by a counterweight 90', mounted on a shaft 72', the link (shown at 96) being pivotally connected to a rock-arm 97, secured to the shaft 72', to which shaft the counterweight is fixed, as are also the load-discharging-movement limiter 23' and an arm 98, to the latter of which is pivoted a thrust-rod 518', controlled by an actuator (not shown) for operating the feeder from the position shown in full lines in Fig. 10 to that indicated by full lines in Fig. 9. This thrust-rod and the rock-arm 98 also control the movements of a slotted link 18' for coupling the driving-wheel D to and uncoupling it from the main driving-shaft 99, this driving-wheel serving to control the movements of a driving-belt 13' for operating the endless feeder F'. It will be noticed that this feeder F' is driven by a band-wheel 15' on the reciprocating traveler V' and that the driving-belt swings with the movement of said traveler.

The load-supplying-movement limiter, coöperative with the stop 23', is shown at 43' and is mounted on the side of the bucket G'.

Figures 4, 5:
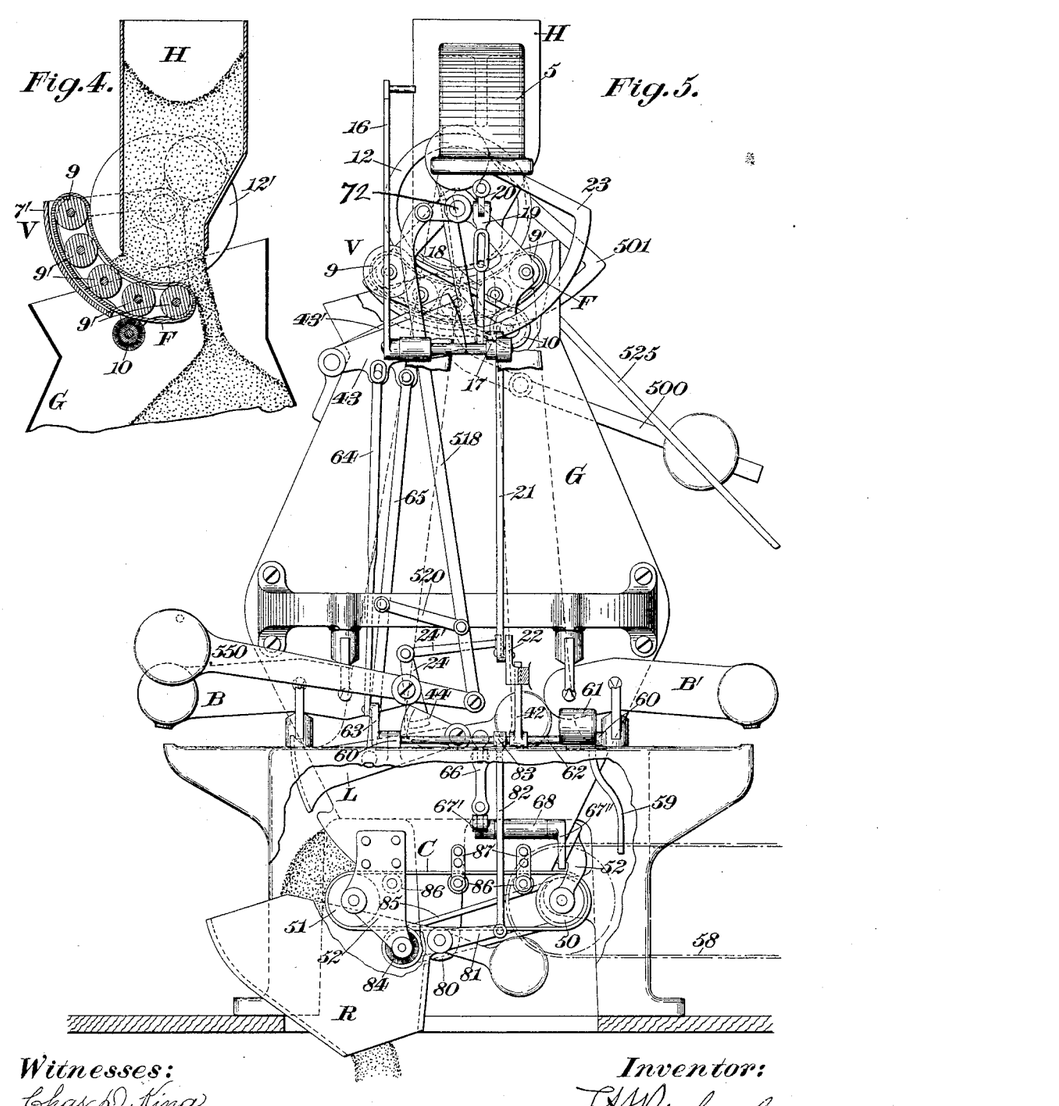
Fig. 4 is a detail sectional view of a portion of the stream-controller and adjacent parts, illustrating the positions assumed by said controller at the beginning of the reducing period for delivering a drip-stream to the load-receiver.
Fig. 5 is a view, similar to Fig. 3, illustrating the supply entirely cut off and the load discharging from the bucket.

The operation of a machine constructed in accordance with my present improvements, as illustrated in Figs. 1 to 8, inclusive, of the drawings, is as follows: It being understood that the several operative mechanisms and devices are in the positions shown in Figs. 1 and 3, that the full stream is being delivered from the supply-spout into the bucket, that the belt 13 is on the fast pulley 15 and is rotating the shaft 72, that the closer L is shut, that the conveyer C is still, owing to the fact that the driving-belt 58 is on the loose pulley 57, and that the regulator-hopper R is held up by its counterweight, it will be apparent that the driver 12 will rotate and impart a traveling movement to the feeder F and thereby rotate the rollers 9 and 9', and also drive the brush 10 to keep the outer surface of the feeding-conveyer clean. As soon as the main portion of the load is made up in the bucket the latter will begin to descend, and thereupon as the arms of the scale-beams descend the actuator 500, coöperating with the cam 501, will become effective to oscillate the feeder-carrier of the stream-controller and will carry the same to the position shown in Fig. 4, whereupon the drip-lever 525 will engage the stop 526 (see Fig. 6) and the feeder-carrier will be held against further oscillation during the reducing period and until the cut-off of the stream. As soon as the bucket is overpoised the stop 526 will release the drip-lever and thereby permit the actuator 500 to become effective to close the feeder-carrier across the mouth of the supply-hopper with a rapid movement. During the whole of the stream-supplying period the feeder F is actuated positively to feed the material off from the forward end thereof into the bucket, but when the stream is cut off the link 19 immediately draws up the link 18 and operates the belt-shipper 16 to shift the belt 13 from the fast pulley 15 on the loose pulley 14, thus stopping the rotation of the driver 12, the traveling movement of the feeder F, and the rotation of the brush 10. At the same time the stop 22 is withdrawn from engagement with the stop 42 and the stop 24 from engagement with the stop 44, as shown in Fig. 5, and thereupon the counterweight 61 becomes effective to shift the belt-shipper 59 from the position shown in Fig. 7 to that illustrated in Fig. 8. As soon as the belt 58 is on the pulley 54 the latter begins to rotate while in the position shown in dotted lines in Fig. 8, and the cam-face 56, riding up the face of the stop 50'', causes the shifting of the pulley 54 to the right and wedges it between the stops 50' and 50'' after said pulley has made about a quarter-revolution. The positive shifting of this pulley by the action of the driving-belt 58 also causes the angle-lever 67' to draw the link 62 and thereby operate the closer L to uncover the outlet-opening in the bucket at the delivery end of the load-discharging conveyer C. It should be noted that this uncovering of the outlet-opening will take place just before the pulley 54 is coupled fast to the rotary carrier 50, and that as soon as this coupling action is completed the conveyer C will begin to travel and positively feed the material comprising the load to discharge such material into the regulator-hopper R. The regulator will be shifted immediately by the weight of the mass discharged thereinto from the position shown in Fig. 3 to that represented in Fig. 5, thus carrying the hooked end 82' of the belt-shipping rod 82, past the by-pass 83', to the position shown in dotted lines in Fig. 2. The shifting of the belt-shipper 59 by means of the weight 61 also causes the connecting-rods 64 and 65 to carry the stops 43 and 43' to the positions shown in Fig. 5, where they will be effective to prevent the opening movement of the stream-controller until they are withdrawn. The stops 44 and 42 will at the same time become effective to lock the stops 24 and 22, respectively, so as to block the throwing on of the belt 13 until said stops are released. Until the conveyer C stops traveling the closer L will be held open by the operating connections therefor controlled by the pulley 54, and the movement of this conveyer will not cease until all of the material shall have been discharged from the bucket and passed out of the regulator R. As soon, however, as this regulator returns to the position shown in Fig. 3 the hooked end 82' of the actuating-rod 82 will engage the stop 83' and move the same from the position shown in dotted lines to that illustrated in full lines in Fig. 2, thus oscillating the rock-shaft 62 and shifting the belt-shipper 59 back to the position illustrated in Figs. 1 and 7. Thereupon the stop 42 is withdrawn from the stop 22, but the stream-controller is still blocked by the stops 44, 24, 43', and 43, and hence neither the feeder nor the belt-shipper for the feeder can be actuated.

On the shifting of the belt-shipper 59, however, the rotation of the pulley 54 and the traveling movement of the load-discharging conveyer cease and the weight of the rear end of the closer becomes effective to shut the same, whereupon the operating connections 66, 67', and 67 cause the arm 67'' of the angle-lever to force the pulley 54 to the left, as seen in Figs. 1 and 7, the angles of the cam-faces 55 and 56 being sufficiently steep to permit this pulley to be shifted readily to the position illustrated in these figures, it being obvious that the driving-pulley will rotate slightly (about a quarter-revolution) in returning to its idle position. As soon as the closer closes the stop 44 is withdrawn from engagement with the stop 24 and the stop 43' from engagement with the stop 23, it being apparent that the stop 43 has been previously withdrawn from engagement with the stop 23 by the oscillation of the rock-shaft 62. All of these stops being now unlocked, the actuator 550, which on the discharge of the first portion of the load from the bucket was carried to the position shown in Fig. 5 and its movement for actuating the stream-controller blocked, becomes effective to operate the stream-controller from the position shown in Fig. 5 to that illustrated in Fig. 3, to thereby uncover the mouth of the supply-chute and permit the delivery of the stream for the making up of a new load. At the same time the connections from the shaft 72 cause the shifting of the belt-shipper 16 to throw on the belt 13 again and carry the stops 22 and 24 into position to block the load-discharging movements of the closer L and the conveyer C.

Having described my invention, I claim—

1. The combination with stream-supplying means, of a stream-controller coöperative therewith and consisting of a movable feeder-carrier and an endless-band feeder movable across the path of the supply-stream to vary the size of said stream.

2. The combination with stream-supplying means, of a stream-controller coöperative therewith and consisting of a reciprocatory feeder-carrier and an endless-band feeder movable across the path of the supply-stream to vary the size of said stream.

3. The combination with stream-supplying means, of a stream-controller coöperative therewith and consisting of an oscillatory feeder-carrier and an endless-band feeder movable across the path of the supply-stream to vary the size of said stream.

4. The combination with stream-supplying means, of a stream-controller coöperative therewith and consisting of a movable feeder-carrier and an endless-band feeder movable across the path of the supply-stream to vary the size of said stream; and separate actuators for the carrier and feeder.

5. The combination with stream-supplying means, of a stream-controller coöperative therewith and consisting of a movable feeder-carrier and an endless-band feeder movable across the path of the supply-stream to vary the size of said stream; and rotary driving means for actuating said feeder.

6. The combination with stream-supplying means, of a stream-controller coöperative therewith and consisting of a movable feeder-carrier and an endless-band feeder movable across the path of the supply-stream to vary the size of said stream; and intermittently-rotative driving means for actuating said feeder.

7. The combination with stream-supplying means, of a stream-controller coöperative therewith and consisting of an oscillatory feeder-carrier and an endless-band feeder movable across the path of the supply-stream to vary the size of said stream; and a feeder-driver having its axis of movement coincident with that of the carrier.

8. The combination with stream-supplying means, of a stream-controller coöperative therewith and consisting of an oscillatory feeder-carrier and an endless-band feeder movable across the path of the supply-stream to vary the size of said stream; and a rotary feeder-driver having its axis of movement coincident with that of the carrier.

9. The combination with stream-supplying means, of a stream-controller coöperative therewith and consisting of an oscillatory feeder-carrier and an endless-band feeder movable across the path of the supply-stream to vary the size of said stream; and a rotary feeder-driver engaging one of the runs of the feeder and having its axis of movement coincident with that of the carrier.

10. The combination with stream-supplying means, of a stream-controller coöperative therewith and comprising an oscillatory feed-carrier, a plurality of rollers having their inner faces in an arc struck from the axis of oscillation of the carrier, an endless-band feeder movable across the path of the supply-stream to vary the size of said stream carried by said rollers; and a feeder-driver engaging the inner run of the feeder and having its axis of movement coincident with that of the carrier.

11. The combination with stream-supplying means, of a stream-controller coöperative therewith and consisting of a movable feeder-carrier and an endless-band feeder movable across the path of the supply-stream to vary the size of said stream; actuating means for imparting a closing movement to the stream-controller; and a feeder-driver operative during said closing movement of the stream-controller.

12. The combination with stream-supplying means, of a stream-controller coöperative therewith and consisting of a movable feeder-carrier and an endless-band feeder movable across the path of the supply-stream to vary the size of said stream; actuating means for imparting stream-reducing and cut-off movements to the stream-controller; and a feeder-driver operative during said stream-reducing movement of the stream-controller.

13. The combination with stream-supply means, of a stream-controller coöperative therewith and consisting of a movable feeder-carrier and an endless-band feeder movable across the path of the supply-stream to vary the size of said stream; and a scraper supported on said carrier and coöperative with said feeder.

14. The combination with stream-supplying means, of a stream-controller coöperative therewith and consisting of a movable feeder-carrier and an endless-band feeder movable across the path of the supply-stream to vary the size of said stream; and a rotary scraper supported on said carrier and coöperative with said feeder.

15. In an automatic weighing-machine, the combination with an endless feeding-conveyer and with an endless load-discharging conveyer supported on the weighing mechanism of said machine and movable therewith during the weighing of the load; of actuating means for said conveyers; and a conveyer-movement limiter operative with one of said conveyers, for limiting the movement of the other.

16. In an automatic weighing-machine, the combination with an endless feeding-conveyer and with an endless load-discharging conveyer supported on the weighing mechanism of said machine and movable therewith during the weighing of a load; of actuating means for said conveyers; and alternately-effective conveyer-movement limiters operative, respectively, with said conveyers.

17. In an automatic weighing-machine, the combination with an endless feeding-conveyer and with an endless load-discharging weighing-conveyer for supporting the load while the material is being weighed; of actuating means for said conveyers; and alternately-effective conveyer-movement limiters operative, respectively, with said conveyers.

18. In an automatic weighing-machine, the combination with an endless feeding-conveyer and with an endless load-discharging conveyer; of actuating means for said conveyers; automatic couplers between said actuating means and said respective conveyers; and alternately-effective stops operative, respectively, with said couplers for blocking the coupling-movements of each of said couplers, respectively, while the other is coupled.

19. In an automatic weighing-machine, the combination with an endless feeding-conveyer and with an endless load-discharging conveyer; of fast pulleys for driving said conveyers; loose pulleys for said conveyers; driving-belts, one for each conveyer; belt-shippers for shifting said belts from the loose pulleys to the fast pulleys, and vice versa; and alternately-effective stops operative, respectively, with said belt-shippers, for blocking the shifting of each of said belts, respectively, onto the other fast pulley while the other belt is on its fast pulley.

20. In an automatic weighing-machine, the combination with the framework; of an endless feeding-conveyer; an endless load-discharging conveyer supported on the weighing mechanism of the machine and movable therewith during the weighing of the load; and alternately-effective conveyer-movement limiters supported on the framework and operative, respectively, with said conveyers.

21. In an automatic weighing-machine, the combination, with stream-controlling means; of a closer and a force-feed load-discharger, both operative on the weighing of each load; and alternately-effective load-supplying-movement and load-discharging-movement limiters, the former operative with the closer and said load-discharger, and the latter with the stream-controlling means.

22. In an automatic weighing-machine, the combination, with stream-controlling means, of a closer and a force-feed load-discharger successively operative on the weighing of each load; and alternately-effective load-supplying-movement and load-discharging-movement limiters, the former operative with the closer and said load-discharger, and the latter with the stream-controlling means.

23. In an automatic weighing-machine, the combination with stream-controlling means and with a bucket having a discharge-opening at the delivery end of the load-discharging conveyer; of a closer for said opening; means for actuating the closer to uncover said opening; a load-discharging conveyer operative on the opening of the closer; and alternately-effective load-supplying-movement and load-discharging-movement limiters, the former operative with the closer and the conveyer and the latter with the stream-controlling means.

24. In an automatic weighing-machine, the combination with stream-controlling means and with a bucket having a discharge-opening at the delivery end of the load-discharging conveyer; of a closer for said opening; means for actuating the closer to uncover said opening; an endless load-discharging conveyer operative on the opening of the closer; and alternately-effective load-supply-movement and load-discharging-movement limiters, the former operative with the closer and the conveyer and the latter with the stream-controlling means.

25. In an automatic weighing-machine, the combination, with stream-controlling means; of a closer and a force-feed load-discharger, both operative on the weighing of each load; and two pairs of alternately-effective load-supplying-movement and load-discharging-movement limiters, one pair operative with the closer and with the stream-controlling means, and the other pair operative with said load-discharger and said stream-controlling means.

26. In an automatic weighing-machine, the combination, with stream-controlling means; of a closer and a force-feed load-discharger, both operative on the weighing of each load;

and two simultaneously-operative pairs of alternately-effective load-supplying-movement and load-discharging-movement limiters, one pair operative with the closer and with the stream-controlling means, and the other pair operative with said load-discharger and said stream-controlling means.

27. In an automatic weighing-machine, the combination, with stream-controlling means; of a closer and a force-feed load-discharger, both operative on the weighing of each load; two pairs of alternately-effective load-supplying-movement and load-discharging-movement limiters, one pair operative with the closer and with the stream-controlling means, and the other pair operative with said load-discharger and said stream-controlling means; and connections between the load-discharging-movement limiters, for actuating them simultaneously.

28. In an automatic weighing-machine, the combination, with an endless feeder and with means for actuating the same; of a closer and a force-feed load-discharger, both operative on the weighing of each load; and two pairs of alternately-effective load-supplying-movement and load-discharging-movement limiters, one pair operative with the closer and with the feeder, and the other pair operative with said load-discharger and said feeder.

29. In an automatic weighing-machine, the combination with stream-supplying means; of a stream-controller coöperative therewith and consisting of a movable feeder-carrier and a feeder movable across the supply-stream; a load-discharger; and alternately-effective load-supplying-movement and load-discharging-movement limiters, the former operative with the load-discharger and the latter with the feeder-carrier and with the feeder.

30. In an automatic weighing-machine, the combination with stream-supplying means; of a stream-controller coöperative therewith and consisting of a movable feeder-carrier and an endless-band feeder movable across the supply-stream, to vary the size of said stream; a feeder-actuator; a load-discharger; and alternately-effective load-supplying-movement and load-discharging-movement limiters, the former operative with the load-discharger and the latter with the feeder-carrier and with the feeder-actuator.

31. In an automatic weighing-machine, the combination, with stream-supplying means, of a stream-controller coöperative therewith and comprising a movable feeder-carrier and a feeder movable across the supply-stream; a closer and a force-feed load-discharger, both operative on the weighing of each load; and alternately-effective load-supplying-movement and load-discharging-movement limiters, the former operative with the closer and said load-discharger, and the latter with the feeder-carrier and the feeder.

32. In an automatic weighing-machine, the combination, with stream-supplying means, of a stream-controller coöperative therewith and comprising a movable feeder-carrier and an endless feeder; a feeder-actuator; a closer and a force-feed load-discharger, both operative on the weighing of each load; and alternately-effective load-supplying-movement and load-discharging-movement limiters, the former operative with the closer and said load-discharger, and the latter with the feeder-carrier and the feeder-actuator.

33. In an automatic weighing-machine, the combination with stream-supplying means; of a stream-controller coöperative therewith and comprising a movable feeder-carrier and an endless feeder; a feeder-actuator; a load-discharger and an endless load-discharging conveyer, both operative on the weighing of each load; a conveyer-actuator for said load-discharging conveyer; and alternately-effective load-supplying-movement and load-discharging-movement limiters, the former operative with the load-discharger and with the conveyer-actuator and the latter with the feeder-carrier and the feeder-actuator.

34. In an automatic weighing-machine, the combination with stream-supplying means; of a stream-controller coöperative therewith and comprising a movable feeder-carrier and an endless feeder; a load-discharger and an endless load-discharging conveyer, both operative on the weighing of each load; driving means for the feeder and said conveyer; a feeder-coupler and a conveyer-coupler for alternately coupling the feeder and conveyer to, and uncoupling them from, the driving means; and alternately-effective load-supplying-movement and load-discharging-movement limiters, the former operative with the load-discharger and with the conveyer-coupler and the latter with the feeder-carrier and the feeder-coupler.

35. In an automatic weighing-machine, the combination with stream-supplying means; of a stream-controller coöperative therewith and comprising a movable feeder-carrier and an endless feeder; a load-discharger and an endless load-discharging conveyer, both operative on the weighing of each load; a driving-belt for the feeder; a driving-belt for said conveyer; a fast pulley and a loose pulley for each of said driving-belts; belt-shippers for said driving-belts; and alternately-effective load-supplying-movement and load-discharging-movement limiters, the former operative with the load-discharger and with the belt-shipper for the feeder-driving belt and the latter operative with the feeder-carrier and with the belt-shipper for the conveyer-driving belt.

36. In an automatic weighing-machine, the combination with a stream-controller; of a bucket having a closer and an endless load-discharging conveyer; means for actuating the stream-controller, the closer, and said conveyer; and alternately-effective load-supplying-movement and load-discharging-movement limiters, the former operative with the stream-controller and the latter supported on the bucket and operative, respectively, with the closer and the load-discharger.

37. The combination with a loose pulley, of a driving-belt normally carried thereon; belt-shipping means; a rotary carrier; a pulley loosely mounted on said carrier and slidable thereon; and a friction-coupling embodying a cam operative for sliding said second pulley along the rotary carrier and coupling it thereto, on the shifting of the driving-belt, onto said pulley.

38. The combination with a loose pulley, of a driving-belt normally carried thereon; belt-shipping means; a rotary carrier; a pair of stops on said carrier, one having a cam-face oblique to the axis of the carrier; and a pulley loosely mounted on said carrier and slidable thereon between said stops and having a cam-face coöperative with that of the stop and in position and adapted for sliding said pulley along the rotary carrier and coupling it thereto, on the shifting of the driving-belt, onto said pulley.

39. In an automatic weighing-machine, the combination with a bucket having a closer and also having an endless load-discharging conveyer; of a rotary carrier for said conveyer; a loose pulley; a driving-belt normally carried on said pulley; belt-shipping means; a pulley loosely mounted on the rotary carrier and slidable thereon; a friction-coupling embodying a cam operative for sliding said pulley along the rotary carrier and coupling it thereto, on the shifting of the driving-belt, onto said pulley; and pulley-shifting means for returning said pulley to its normal position.

40. In an automatic weighing-machine, the combination with a bucket having a closer and also having an endless load-discharging conveyer; of a rotary carrier for said conveyer; a loose pulley; a driving-belt normally carried on said pulley; belt-shipping means; a pulley loosely mounted on the rotary carrier and slidable thereon; a friction-coupling embodying a cam operative for sliding said pulley along the rotary carrier and coupling it thereto, on the shifting of the driving-belt, onto said pulley; and closer-operated pulley-shifting means for returning said pulley to its normal position.

41. In a weighing-machine, the combination with a bucket having a closer and also having an endless load-discharging conveyer; of a rotary carrier for said conveyer; a loose pulley; a driving-belt normally carried on said pulley; belt-shipping means; a pulley loosely mounted on said carrier and slidable thereon and operative for actuating the closer to open the same on the coupling of said pulley to the rotary carrier; a friction-coupling embodying a cam operative for sliding said second pulley along the rotary carrier and coupling it thereto, on the shifting of the driving-belt, onto said pulley; and closer-operated pulley-shifting means for returning said pulley to its normal position.

FRANCIS H. RICHARDS.

Witnesses:
F. N. CHASE,
BENTON N. PARKER.